(12) United States Patent
Ketelsen et al.

(10) Patent No.: US 6,260,420 B1
(45) Date of Patent: Jul. 17, 2001

(54) INDUCTIVE FLOW METER SIGNAL LINE AND ELECTRODE ARRANGEMENT

(75) Inventors: Andres Ketelsen, Asternweg 15, D-37124 Rosdorf; Jörn-Ove Ketelsen, Adelebsen, both of (DE)

(73) Assignees: Broder Ketelsen; Andres Ketelsen, both of Rosdorf (DE)

(*) Notice: Subject to any disclaimer, the term of this patent is extended or adjusted under 35 U.S.C. 154(b) by 0 days.

(21) Appl. No.: 09/043,875

(22) PCT Filed: Sep. 17, 1996

(86) PCT No.: PCT/DE96/01762

§ 371 Date: Aug. 27, 1998

§ 102(e) Date: Aug. 27, 1998

(87) PCT Pub. No.: WO97/12208

PCT Pub. Date: Apr. 3, 1997

(30) Foreign Application Priority Data

Sep. 27, 1995 (DE) ............................................. 195 35 997

(51) Int. Cl.$^7$ .................................................. G01F 1/58
(52) U.S. Cl. ........................................................ 73/861.12
(58) Field of Search ........................... 73/861.12, 861.11, 73/861.08, 861.13, 861.16

(56) References Cited

U.S. PATENT DOCUMENTS

| | | | |
|---|---|---|---|
| 3,924,466 | 12/1975 | Medlar | 73/194 |
| 4,019,385 | 4/1977 | Watanabe | 73/194 EM |
| 4,346,604 | 8/1982 | Snook et al. | 73/861.12 |
| 4,358,963 | 11/1982 | Schmoock | 73/861.12 |
| 4,428,241 | 1/1984 | Davis et al. | 73/861.12 |
| 4,507,975 | 4/1985 | Bittner et al. | 73/861.12 |
| 4,679,442 | 7/1987 | Kubota | 73/861.12 |
| 4,715,233 | 12/1987 | Neven et al. | 73/861.12 |
| 4,825,703 | 5/1989 | Kubota | 73/861.12 |
| 4,932,268 | 6/1990 | Hafner | 73/861.12 |
| 5,448,920 | 9/1995 | Ketelsen et al. | 73/861.12 |
| 5,583,299 | 12/1996 | Murase | 73/861.12 |

FOREIGN PATENT DOCUMENTS

| | | |
|---|---|---|
| 15 73 066A | 10/1970 | (DE). |
| 20 09 513 | 9/1971 | (DE). |
| 17 73 484 | 11/1971 | (DE). |
| 25 05 427 | 8/1976 | (DE). |
| 34 01 377 | 7/1985 | (DE). |
| 51-70667 | 6/1976 | (JP). |

OTHER PUBLICATIONS

PCT/DE96/01762 International Search Report.

*Primary Examiner*—Eric S. McCall
*Assistant Examiner*—Jagdish Patel
(74) *Attorney, Agent, or Firm*—Fish & Richardson P.C.

(57) ABSTRACT

An inductive flow meter has a measurement channel body with an electrically insulating inner wall and defining a flow channel that extends along a longitudinal axis. A pair of electrodes is exposed to said flow channel at its inner wall so as to be in contact with a medium flowing within said channel, and are diametrically opposed to each other in a transverse plane perpendicular to the longitudinal axis. A pair of magnetic pole shoes of a magnetic field generating system is arranged on opposite sides of the measurement channel body and centered about the transverse plane containing the electrodes, with the shoes adapted to generate a magnetic field across the flow channel section, such that lines of the magnetic field extend essentially perpendicular to both the longitudinal axis and a straight line between the electrodes. Two associated, electrically conductive signal lines extend between the electrodes and associated connector lugs on an outer surface of the measurement channel body. One of the signal lines extends directly radially between its associated electrode and connector lug, and the other of the signal lines is arranged with such symmetry with respect to a point mid-way between the electrodes that inductive effects in its opposite portions cancel each other out. In some embodiments, the signal lines and electrodes arranged symmetrically with respect to the transverse plane containing the electrodes and about which the pole shoes are centered.

13 Claims, 6 Drawing Sheets

INDUCTIVE FLOW METER SIGNAL LINE AND ELECTRODE ARRANGEMENT

BACKGROUND OF THE INVENTION

The present invention relates to inductive flow meters.

Practitioners skilled in this art are familiar with the type of inductive flow meter having a flow channel section that is defined by an electrically insulating inside wall, with the flow channel section containing two electrodes that are diametrically opposed across a cross-section of the flow channel section and exposed to the flow medium that is under investigation. Insulated measurement signal lines are connected to the electrodes, and a magnetic field generating system that is situated outside the flow channel section is used to generate a magnetic field that passes through the flow channel section in the vicinity of the cross-section referred to above, which contains the electrodes. This magnetic field is essentially perpendicular to a connecting line between the electrodes and is perpendicular to the longitudinal axis of the flow channel section, being established between the pole shoes of the magnetic field generating system that are arranged on opposing sides of the flow channel section. The field windings of the magnetic field generating system can be energized either with direct current or with alternating current, and a measurement signal that is a function of the flow of an electrically conductive medium within the flow channel section (a DC voltage signal or an AC signal, depending on the manner in which the exciter winding of the magnetic field generating system has been energized) can be tapped off. Inductive flow meters of this general design and their method of operation are familiar to the practitioner skilled in the art.

For example, DE-OS 1 773 484 shows a measurement channel body containing the flow channel section manufactured from plastic, with the electrodes and the measurement signal lines that lead to them insert-molded. This results in a defined position of the electrodes and the measurement signal lines relative to the flow channel and reduces the costs associated with calibrating and adjusting operations for the production of large numbers of such a device.

U.S. Pat. No. 4,428,241 shows measurement signal lines that lead to the electrodes of a flow meter of the general type in question, arranged on a circuit board like a printed circuit. The circuit board is held by special retaining devices in a defined position relative to the magnetic field generating system of the flow meter, with the circuit board situated adjacent to a measurement channel body that contains the flow channel section, and a pole of the magnetic field generating system passing through an opening in the circuit board.

Publication DE-OS 3 401 377 shows and describes an inductive flow meter of the general type described above, in which the electrodes that are exposed to the flow medium are embedded in the wall of a flow channel body that contains the flow channel section. Measurement signal lines are routed from the flow channel body through peripheral and axial grooves in the pole shoe arrangement of the magnetic field generating system. However, these measurement signal lines are not held in a fixed position within narrow limits, either by the measurement channel body or by the magnetic field generating system.

SUMMARY OF THE INVENTION

It is the task of the present invention to create an inductive flow meter of the type described in the introduction hereto, which lends itself to large-scale production, is of comparatively simple construction that ensures a high level of mechanical strength, and permits precise mounting of its parts, the construction of which reduces the expenditures that are associated with equalizing and adjusting operations performed during serial production.

According to one aspect of the invention, an inductive flow meter has a measurement channel body that incorporates a flow channel section with an electrically insulating inner wall, and two electrodes that are diametrically opposed to each other across a cross-section of the flow channel and exposed to the medium that is under investigation. The electrodes are enclosed in the measurement channel body in the same way as insulated measurement signal lines that lead to the electrodes and the connecting points to the electrodes. A magnetic field generating system establishes a magnetic field that passes through the flow channel section in the area of said cross-section, which is essentially perpendicular to the connecting line between the electrodes and perpendicular to the longitudinal axis of the flow channel section. The magnetic field is established between pole shoes of the magnetic field generating system, said pole shoes being arranged on opposing sides of the measurement channel body. The measurement signal lines are stamped out blanks of conductive foil or conductive sheet metal.

In some embodiments, the measurement signal lines are formed from electrode material, and the electrodes are connected in one piece to the measurement signal lines and form part of the stamped out conductive foil blanks or the conductive sheet metal blanks.

In some cases, the measurement signal lines are formed as conductor strips that are embedded in the measurement channel body, with their wide dimension oriented so as to be essentially parallel to the magnetic field generated by the magnetic field generating system.

In some embodiments, the measurement channel body is divided in its cross-section plane that contains the electrodes and is formed from two shaped bodies that can be combined. The electrodes, the measurement signal lines, and their connection points to the electrodes are sealed into matching recesses on the parting line.

In some embodiments, the measurement channel body is an injection-molded part in which the electrodes, the measurement signal lines, and their collection points to the electrodes are cast, at least in part.

In some embodiments, the electrodes and/or the measurement signal lines are provided with extensions that project beyond the outer surface of the measurement channel body, these extensions being intended for insertion into the core print of the injection mould during production of the measurement channel body.

In some embodiments, the measurement signal line that leads to the electrode on one side of the measurement channel body passes through the measurement channel body wall directly in a radial direction, whereas the measurement signal lines that lead to the other electrode incorporate measurement signal lines sections that are symmetrical to the magnetic field of the magnetic field generating system and to the cross section plane that contains the electrodes.

In some embodiments, the measurement signal lines sections within the measurement channel body incorporate axially routed line sections that run upstream and downstream between cross section planes from the cross section area of the measurement channel body that is occupied by the magnetic field generating system and/or from such cross section areas to the cross-section area of the measurement channel body that contains the electrodes.

In some instances, at least one of the axially routed long pieces of the measurement signal lines sections runs in an axial rail-like rib of the wall of the measurement channel body.

In some cases, the measurement channel body and/or on pole shoe elements of the pole shoes of the magnetic field generating system that lie against this from the outside there are recesses and/or projections that are of a matching shape for securing the relative positions of the magnetic field generating system and of the measurement channel body.

In some embodiments, the measurement channel body incorporates recesses on its side walls that are adjacent the pole shoes and opposite each other. The recesses match the shape of the particular pole shoe and accommodate the pole shoe elements that are near the flow channel cross-section in such a way that at least in some areas the pole shoe surfaces that face each other are separated from the flow channel section wall by measurement channel body material that is of reduced thickness.

In some cases, the recesses in the side walls of the measurement channel body incorporate at least one axial, rail-like or radial curved rib that is of measurement channel body material, this rib containing a measurement signal line section and being situated in an appropriately shaped axial or radial recess or break in a pole shoe element or the pole shoe element receptacle.

The individual structural groups or structural units of the inductive flow meter proposed herein permit large-scale production and extremely low production costs. The calibration parameters can be determined by a random sampling procedure for each manufacturing lot, so that it is not necessary to calibrate each device individually.

Operation when energizing the exciter windings of the magnetic field generating system with high frequencies of up to 200 Hz permits the solution of special control tasks when using an inductive flow meter of the type described above.

Cost-intensive equalising and adjusting operations can for the most part be eliminated, and the apparatus will maintain a stable zero point throughout its complete operating time.

BRIEF DESCRIPTION OF THE DRAWINGS

Embodiments of the present invention will be described in greater detail below on the basis of the drawings appended hereto. These drawings show the following.

DETAILED DESCRIPTION OF EMBODIMENTS

Figure 1:
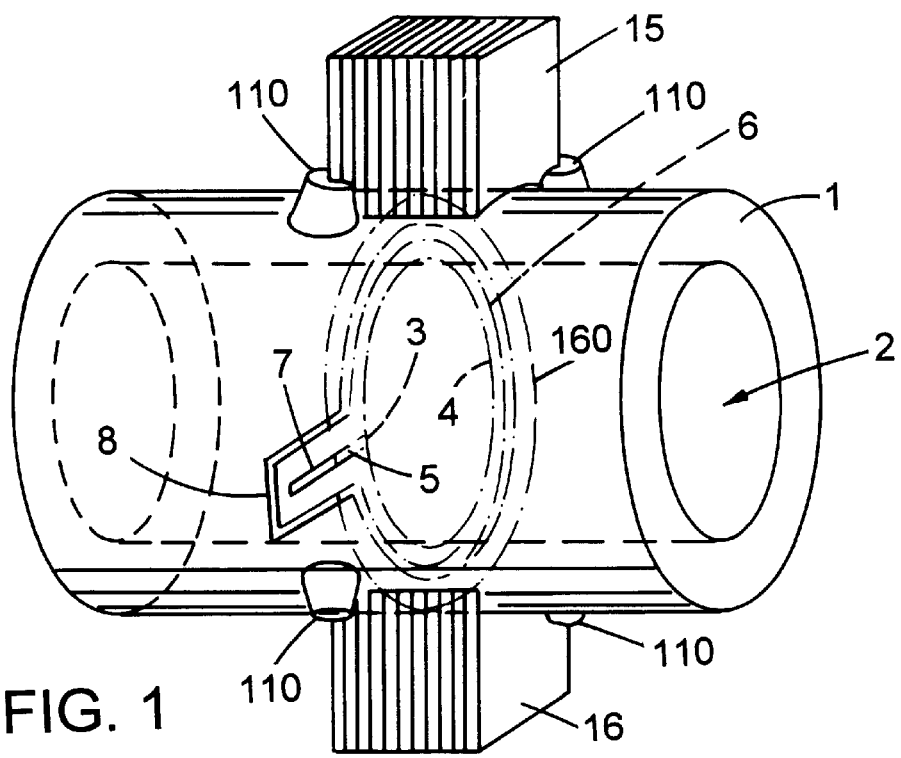
FIG. 1 is a diagrammatic perspective view of a measurement channel body with embedded electrodes and measurement signal lines.

FIG. 1 shows a measurement channel body 1 in the form of a section of tube that is essentially hollow and cylindrical and which is formed as an injection-molded plastic part.

Figure 2:
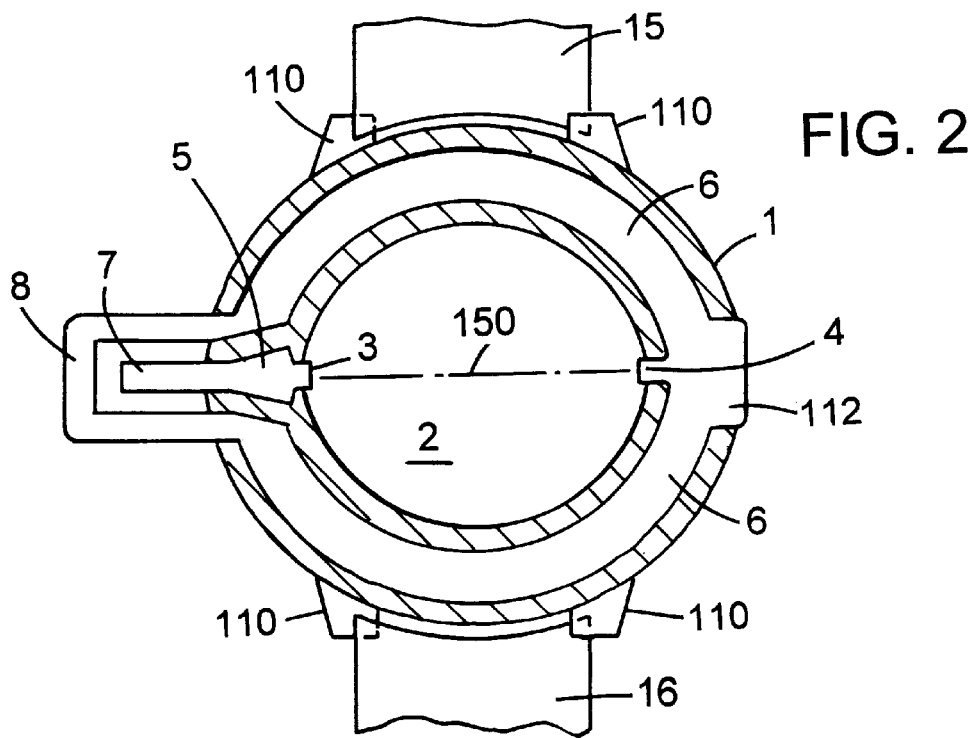
FIG. 2 is a radial cross section through the arrangement shown in FIG. 1, in a cross-sectional area of the measurement channel body that contains the electrodes.

The section of tube defines a flow channel 2 through which the flow of an electrically conductive medium that is under investigation is directed by way of suitable connections or connectors. On the electrically insulating inside wall of the flow channel section 2 of the measurement channel body 1 there are diametrically opposed electrodes 3 and 4 (as shown in FIG. 2), and these electrodes are exposed to the flow medium. Insulated measurement signal lines 5 and 6 are routed to the electrodes through the material of the measurement channel body 1, with the measurement signal line 5 only bridging the short distance between the electrode 3 on the side of the inside wall of the flow channel section 2 and the measurement channel body outside wall, whereas the two semicircular sections of the measurement signal line 6 form the connection of the side of the electrode 4 to the diametrically opposite side of the measurement channel body.

The connections for the measurement signal lines 5 and 6 are in the form of connector lugs 7 and 8, which protrude from the cylindrical outside wall of the measurement channel body 1. Connector lug 8 encloses the connector lug 7 in a U-shape and, together with the associated measurement signal line sections 6, forms a short-circuiting ring that, as will be understood, permits interference-free signal transmission between the electrode 4 and the side of the measurement channel body side on which the electrode 3 is situated.

Mounting sockets 110 are molded onto the upper side and the lower side of the measurement channel body 1 and these incorporate angled recesses such that, in diametrically opposed areas of the cylindrical outside surface of measurement channel body 1, in a direction that is perpendicular to the connecting line 150 between electrodes 3 and 4 and perpendicular to the longitudinal axis of the flow channel section 2, as viewed in the radial direction, there are rectangular guide spaces into which the pole shoe elements 15 and 16 of the magnetic field generating system are fitted. The pole shoe elements 15 and 16 are thus held in a precise position relative to flow channel 2 of measurement channel body 1, as well as in a precise position relative to electrodes 3 and 4 and their associated measurement signal lines 5 and 6 by sockets 110, once the electrodes and the measurement signal lines have been installed securely in measurement channel body 1.

This precision of the elements of the magnetic field generating system, of the measurement channel body, and of the electrodes and the measurement signal lines results not only from the precise assembly of the parts relative to each other, but also from the type and manner of the production of the measurement channel body as an injection-molded part (or the fact that it is produced from injection molded parts), and also from the solid inclusion of the electrical conductors therein.

At this point it should be noted that in the embodiment that is shown in FIGS. 1 and 2, and in the embodiments that are shown and described subsequently, the measurement channel body 1 is in the form of a unified injection-molded part into which the electrodes and the measurement signal lines have been insert-molded. Alternatively, it is possible to make the measurement channel body 1 in two injection-molded parts that are divided on a radial plane and which can be joined, the parting line being provided with recesses 160 in the range of the wall thickness of the measurement channel body 1 in such a way that suitably shaped structural units comprising the electrodes and the measurement signal lines that are connected rigidly thereto are installed in these recesses, and then the injection-molded parts are clamped together to form a unit that is easily manipulated and comprises the measurement channel body, the electrodes, and the measurement signal lines.

It is, however, preferred that the electrodes and the measurement signal lines be cast into the measurement channel body 1 that is in the form of an injection-molded part, since during production, the measurement signal lines and the electrodes that are rigidly connected thereto are inserted into the core point of the injection mold in an exact position relative to the mold space and are kept in this position once the measurement channel body has been removed from the mold. Extensions of the conductors, such as the unattached ends of the electrodes 3 and 4, the connectors 7 and 8, and additional extensions (such as 112 in FIG. 2) can be used as core point support.

In another embodiment not shown in the drawings, tubular inserts (of, for instance, ceramic or a reinforcing material) are molded or cast in measurement channel body 1.

Figure 3:
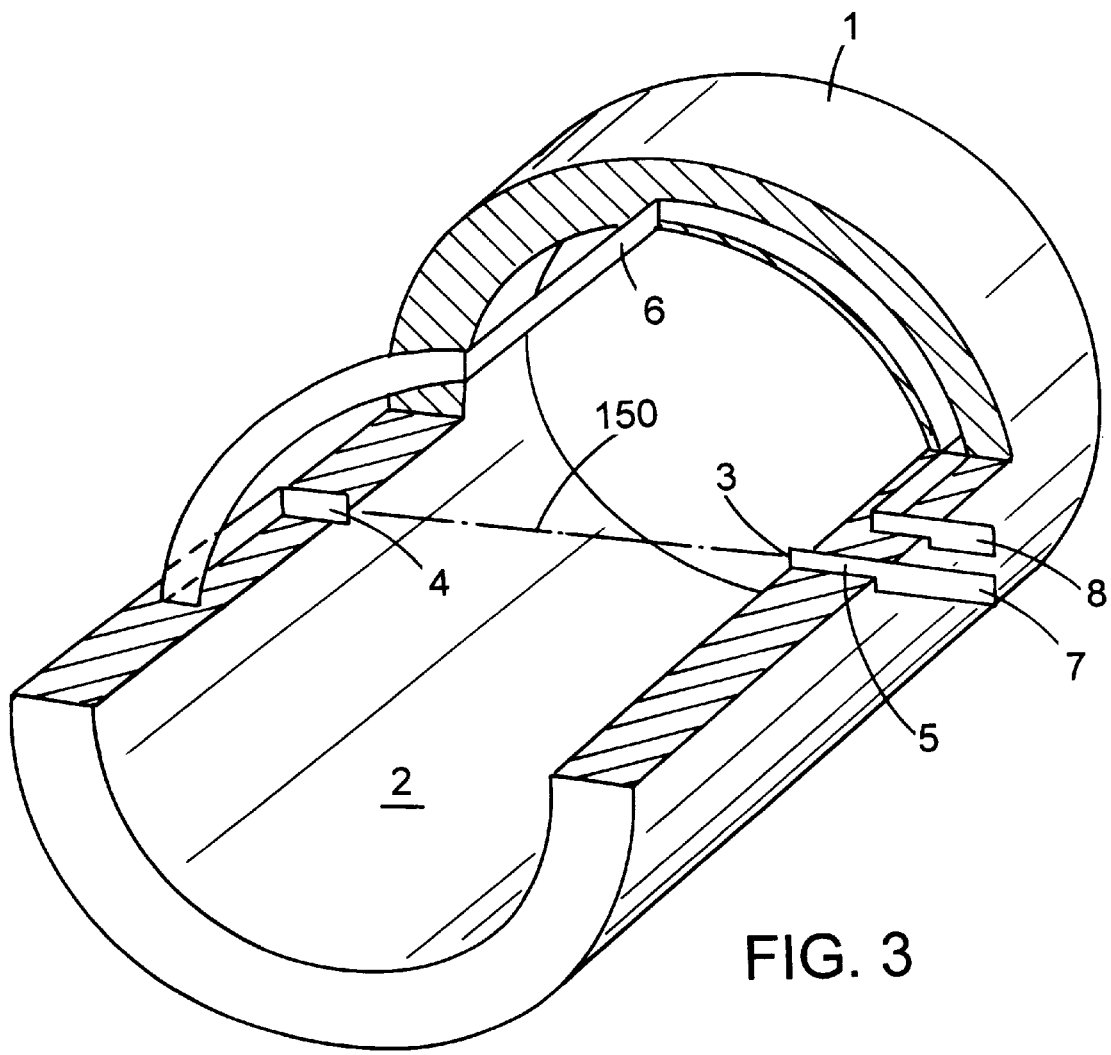
FIG. 3 is a perspective, diagrammatic view of a partially cross-sectioned measurement channel body, showing the electrodes and measurement signal lines that are embedded in the walls of the measurement channel body.

The routing of the measurement signal lines does not necessarily have to be confined to a radial plane that contains electrodes 3 and 4, particularly if measurement channel body 1 is a uniform injection-molded part. The diagrammatic perspective view shown in FIG. 3 indicates one possible routing. The short measurement signal line section 5 runs from the connector 7 directly through the wall of the measurement channel body 1 to the electrode 3. Immediately adjacent to this, a measurement signal line section 6 runs from the connector 8 as far as the middle of the wall of the measurement channel body 1, where it turns in the axial direction and proceeds along an axial section that is longer than the axial extent of the pole shoe element (not shown in FIG. 3) in this same direction, and then turns into a 90° curved section that ends at about the uppermost point of the measurement channel body 1, where it joins a longitudinal portion of line section 6 that extends in the opposite axial direction relative to the axial section adjacent to the connector. The axial length of this longitudinal portion of line section 6 is greater than the total axial extent of the pole shoe elements of the magnetic field generating system. Finally, there is another arc shaped section that extends downwards through 90°. This is followed by an axial line section and finally by a line section of the measurement signal line section 6 that is directed radially inwards to electrode 4. The routing of the measurement signal lines for electrode 4, as shown in FIG. 3, provides a specific symmetry to the radial plane that contains electrodes 3 and 4 and to the magnetic field that passes through flow channel section 2, with only the longitudinal conductor section that connects the 90° curved sections being affected by the magnetic field lines. The signal line passes through two identical parts of the magnetic field with opposite orientation, so that inductive effects in the two parts cancel each other out.

Figure 4:
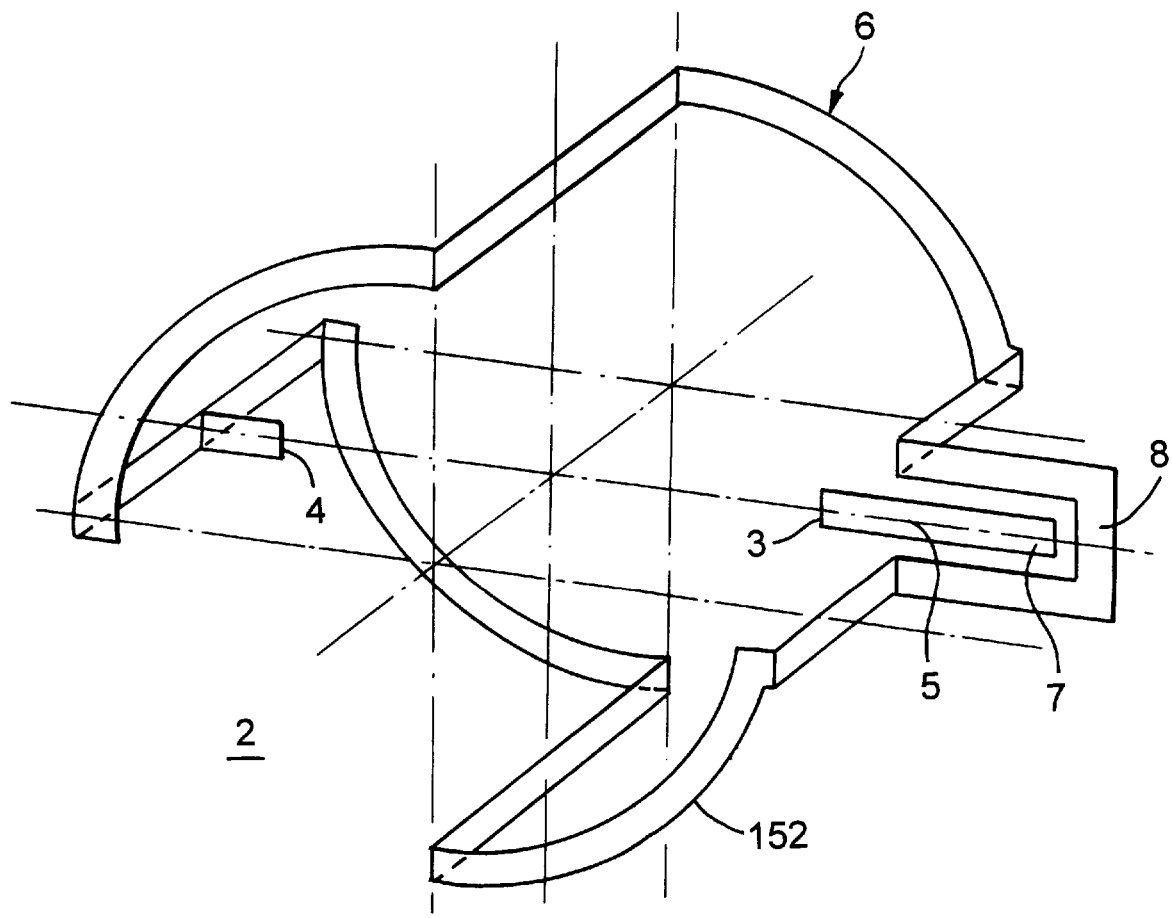
FIG. 4 shows another version of the electrodes and the measurement signal lines, with the surrounding material of the measurement channel body omitted.

FIG. 4 shows a further development of the arrangement of conductors that is associated with electrodes 3 and 4. In addition to signal line section 6 (as shown in FIG. 3) there is an additional signal line section 152 forming a mirror image of line section 6, associated with electrode 4, as the practitioner skilled in the art can recognize in FIG. 4. As viewed in an axial direction, the four quarter-circle curved sections of the measurement signal line section 6 combine to form a short-circuiting ring 6 associated with electrode 4 and completed by the U-shaped connector 8 that encloses connector 7.

Figure 5:
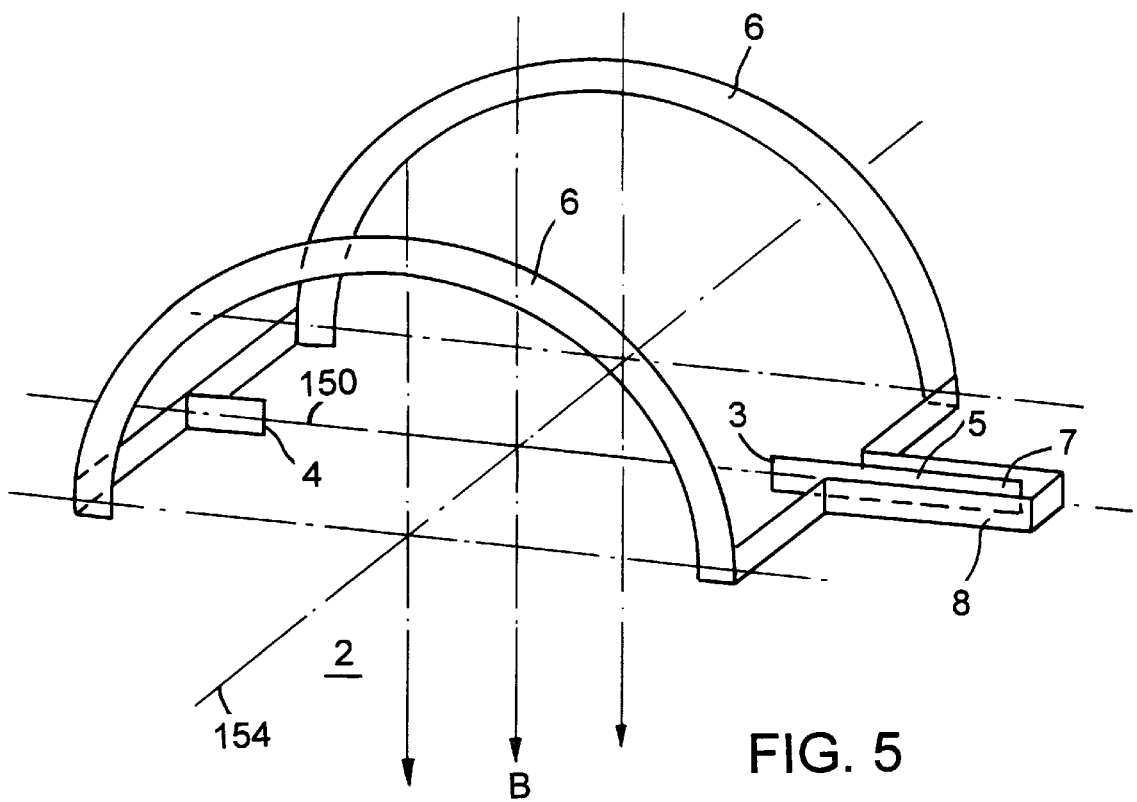
FIG. 5 is a perspective view of yet another configuration of the electrodes and the measurement signal lines, with the surrounding material of the measurement channel body omitted.

FIG. 5 illustrates another arrangement of measurement signal line sections 6 forming a short-circuiting ring associated with electrode 4 in conjunction with U-shaped connector 8. The short circuiting ring formed from the measurement signal line sections 6 of FIG. 5 encloses the magnetic field oriented perpendicular to both connecting line 150 between electrodes 3 and 4, and the longitudinal axis 154 of flow channel section 2.

The following should be noted with respect to the configuration of the structural elements that are cast, in particular injection-molded, into the measurement channel body, namely, the electrodes 3 and 4, the measurement signal lines 5 and 6, and the connectors 7 and 8:

In some cases, it may be useful to manufacture electrodes 3 and 4 from a special electrode material, if necessary one that is matched to the flow medium under investigation, and then connect these electrodes to the associated measurement signal lines by welding, soldering, or the like.

According to a preferred embodiment, however, the measurement signal lines and the associated connectors are of one and the same material as the electrodes 3 and 4, namely an electrode material, and are connected to their respective electrodes 3 and 4 at one piece. In this case, it is possible to configure the electrodes, the measurement signal lines, and the connectors as stamped sheet metal conductors or stamped foil conductors that are shaped, for example, as shown in FIG. 2, or else can be bent to form the shapes that are shown in FIGS. 3 and 5, so that the conductor system can be inserted into an injection mold and then the measurement channel body material molded around them. The production of the electrodes, the measurement signal lines that are connected to them in one piece, and the connectors that lead out of the measurement channel body, as stamped foil parts or sheet metal parts results in properties of the associated electrical system that remain constant over a large series of devices that are to be manufactured, in particular from the electrical standpoint and in conjunction with the magnetic field generating system.

Figure 6:
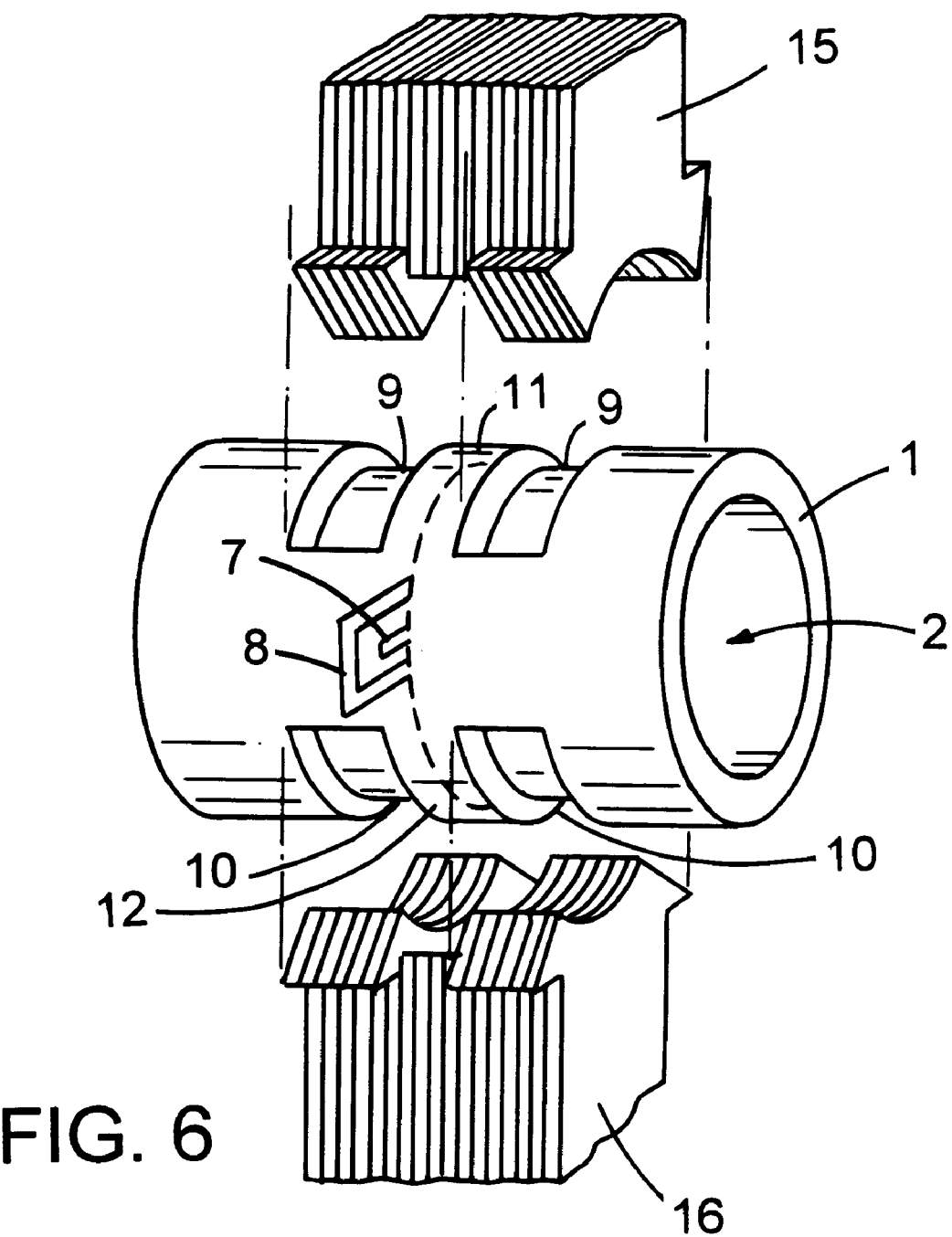
FIG. 6 is a diagrammatic perspective view, as in FIG. 1, of a second preferred version of the measurement channel body, and of pole-shoe elements of a magnetic field generating system that are to be embedded in recesses in the measurement channel body, to form an inductive flow meter of the type proposed herein.

FIG. 6 shows another special configuration in which measurement channel body 1 is fixed relative to the magnetic field generation generating system, the pole shoes 15 and 16 of which being shown in an exploded view in FIG. 6, radially separated from measurement channel body 1. On the side of measurement channel body 1 there is a symmetrically shaped recess 9 in the shape of a hollow cylindrical sector, and on the underside of the measurement channel there is a corresponding, diametrically opposed and similar cylindrical recess 10. The cylindrical recesses 9 and 10 each consist of two axial sections. In other words, at their axial mid-points, each recess 9 and 10 contains an annular rib 11, 12. The importance of this rib will be discussed in greater detail below. The depth of the recesses 9 and 10 is so selected that the bottoms of the recesses remain separated from the flow channel section of the measurement channel body 2 by wall sections, of sufficient strength, of the measurement channel body material.

Elements of the pole shoes 15 or 16 of the magnetic field generating system of the flow meter are inserted into recesses 9 and 10, in a radial direction towards the longitudinal axis of the flow channel section. In the embodiment shown in FIG. 6, the pole shoes 15 and 16, the cores that are connected also no piece with them and wound about by the field windings of the magnetic field generating system, and the yoke elements that are connected to these to complete the magnetic closing circuit, consist of three axially adjacent groups of transformer plates, namely two groups forming the pole shoe elements that extend when assembled into the axial sections of recesses 9 and 10, and an interposed group of plates that are cut back more towards the outside, in the radial direction, such that between the outermost groups of metal plates of pole shoes 15 and 16, there are corresponding annular grooves that accommodate annular ribs 11 and 12.

The recesses 9 and 10, and the elements of pole shoes 15 and 16 that fit into them result in precise positioning of the magnetic field generating system and of the measurement channel body 1 when assembled, such that no equalising and adjustment operations are needed with respect to these structural units. In addition, when assembled, the pole shoe surfaces are pressed against the thin bases of the recesses 9 and 10 and thus support these thin-walled areas against any increased internal pressure within flow channel section 2. The thin-walled sections permit closer spacing between the pole shoe surfaces and thus an increase of the overall efficiency of the device. The energy consumption for energizing the magnetic field generating system can be reduced to the extent that ensures compliance with safety regulations regarding explosions.

Measurement signal line sections 6 are embedded in annular ribs 11 and 12 of measurement channel body 1, which is formed as a plastic injection-molded element.

Figure 7:
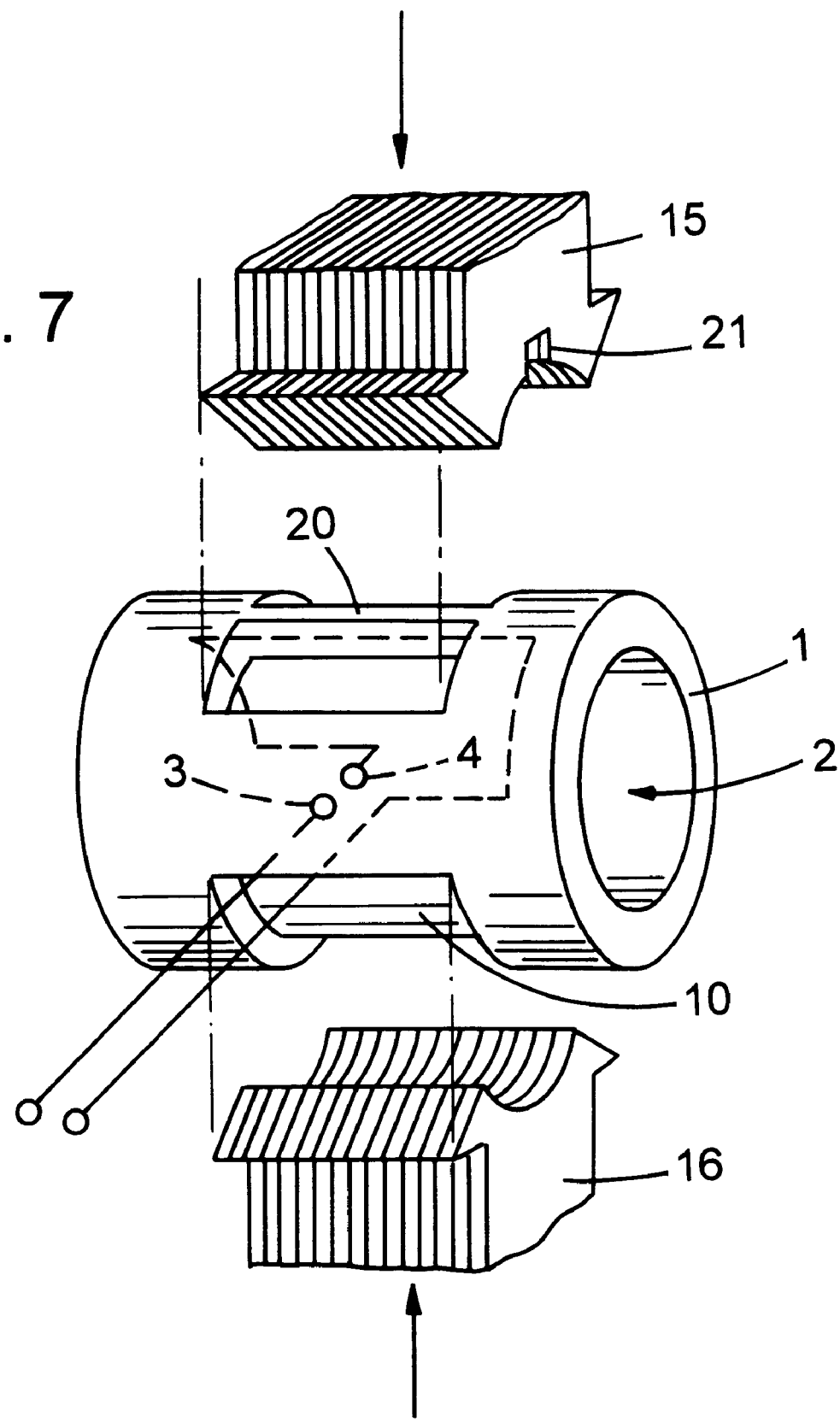
FIG. 7 is a view, similar to the one shown in FIG. 6, of a third version of a measurement channel body with the pole shoe elements that are to be inserted in recesses in the measurement channel body to form another inductive flow meter of the type described herein.

In a modified embodiment of the inductive flow meter shown in FIG. 6, as shown in FIG. 7, the upper cylindrical recess 9 of measurement channel body 1 incorporates an axial rail-like rib 20, and the surface of pole shoe 15 that fits into recess 9 incorporates a corresponding axial groove 21 that accommodates rib 20 when the pole shoe 15 is displaced radially towards the longitudinal axis of flow channel section 2, and the pole shoe elements fit into recess 9. On the opposite side, there is a recess 10 in the wall of measurement channel body 1 that is not divided by a rib, and thus there is no groove in the pole shoe 16 that is to be slid into recess 10.

Also, in the embodiment of FIG. 7, the pole shoes, the cores that are connected in one piece with them and wound about by the excitement winding, and, the yoke elements that are connected to them to complete the magnetic return flow, consist of groups of transformer plates.

The electrode 3 that is located on the inside of measurement channel body 1 is connected directly to connector 7 by an insulated measurement signal line, extending through the wall of the measurement channel body. In contrast to this, the connection between electrode 4 and connector 8 that ensures the symmetrical positions of the signal lines sections relative to the magnetic field of the magnetic field generating system is routed as described in connection with FIG. 3.

What is claimed is:

1. An inductive flow meter comprising:
   a measurement channel body having an electrically insulating inner wall and defining a flow channel that extends along a longitudinal axis;
   a pair of electrodes exposed to said flow channel at said inner wall and in contact with a medium flowing within said flow channel, the electrodes diametrically opposed to each other in a transverse plane perpendicular to said longitudinal axis;
   a pair of magnetic pole shoes arranged on opposite sides of said measurement channel body and centered about said transverse plane containing the electrodes, the shoes configured to generate a magnetic field across the flow channel section, such that lines of the magnetic field extend essentially perpendicular to both said longitudinal axis and a straight line between the electrodes;
   a pair of associated, electrically conductive signal lines extending between the electrodes and associated connector lugs on an outer surface of the measurement channel body;
   the signal lines and electrodes arranged symmetrically about said transverse plane containing the electrodes and about which the pole shoes are centered; and
   wherein at least one of the pole pieces has two sections extending into corresponding recesses in the measurement channel body on either side of the transverse plane.

2. The inductive flow meter of claim 1, wherein the signal lines comprise flat conductor strips oriented to have their broad sides substantially parallel to the magnetic field lines.

3. The inductive flow meter of claim 1, wherein the signal lines comprise stamped sections of conductive foil or sheet metal.

4. The inductive flow meter recited in claim 1, wherein one of the signal lines extends radially between its electrodes and connector lug, another of the signal lines forming at least two electrically parallel electrical paths between its associated electrode and connector lug.

5. The inductive flow meter of claim 4, wherein the two electrically parallel electrical paths together encircle the flow channel.

6. The inductive flow meter of claim 1, wherein the signal lines are integrally formed with their associated electrodes of a common conductive material.

7. The inductive flow meter of claim 1, wherein the signal lines are permanently embedded within material of the channel body.

8. The inductive flow meter of claim 1, wherein the channel body comprises two sections joined at said transverse plane, with the electrodes and signal lines disposed within corresponding recesses formed in one of the two sections of the channel body.

9. The inductive flow meter of claim 1, wherein the channel body is an injection-molded part in which the electrodes and signal lines are insert-molded.

10. The inductive flow meter of claim 9, wherein at least one of the signal lines is provided with an extension projecting beyond the outer surface of the channel body for retaining the signal line as the channel body is molded.

11. The inductive flow meter of claim 1, wherein the connector lug of said one of the signal lines is U-shaped and extends about the connector lug of the other of the signal lines.

12. The inductive flow meter of claim 11, wherein one of the signal lines and its associated connector lug together form a short-circuiting ring about the other of the signal lines and its associated connector lug.

13. An inductive flow meter comprising:
   a measurement channel body having an electrically insulating inner wall and defining a flow channel that extends along a longitudinal axis;

a pair of electrodes exposed to said flow channel at said inner wall and in contact with a medium flowing within said flow channel, the electrodes diametrically opposed to each other in a transverse plane perpendicular to said longitudinal axis;

a pair of magnetic pole shoes arranged on opposite sides of said measurement channel body and centered about said transverse plane containing the electrodes, at least one of the pole shoes having two sections extending into corresponding recesses in the measurement channel body on either side of the transverse plane, the shoes configured to generate a magnetic field across the flow channel section, such that lines of the magnetic field extend essentially perpendicular to both said longitudinal axis and a straight line between the electrodes;

a pair of associated, electrically conductive signal lines extending between the electrodes and associated connector lugs on an outer surface of the measurement channel body, the signal lines comprising flat conductor strips oriented to have their broad sides substantially parallel to the magnetic field lines;

the signal lines and electrodes arranged symmetrically about said transverse plane containing the electrodes and about which the pole shoes are centered.

* * * * *